United States Patent

[11] 3,575,511

[72] Inventor Robert John Francis
Cambridge, England
[21] Appl. No. 790,393
[22] Filed Jan. 10, 1969
[45] Patented Apr. 20, 1971
[73] Assignee Pye Limited
Cambridgeshire, England
[32] Priority Jan. 10, 1968
[33] Great Britain
[31] 1480/68

[54] EBERT MONOCHROMATOR WITH IMPROVED SLIT ILLUMINATION USING A CYLINDRICAL MIRROR
10 Claims, 10 Drawing Figs.

[52] U.S. Cl. ................................................. 356/99
[51] Int. Cl. ................................................. G01j 3/12
[50] Field of Search ..................................... 356/99–101; 350/271

[56] References Cited
UNITED STATES PATENTS
2,797,609 7/1957 White .......................... 356/96
3,454,339 7/1969 Marshall, Jr., et al. ....... 356/101

*Primary Examiner*—Ronald L. Wibert
*Assistant Examiner*—V. P. McGraw
*Attorney*—Watson, Cole, Grindle & Watson ABSTRACT: In a Czerny-Turner monochromator having a curved entrance slit for white light to pass to the mirror and thence the grating, a straight elongated light source is used with optical means, for example a convex lens and a cylindrical reflector, forming at the entrance slit, an image of the light source which is substantially congruent with the curved entrance slit.

PATENTED APR 20 1971

Inventor
Robert John Francis Watson,
Cole, Grindle & Watson
Attorneys

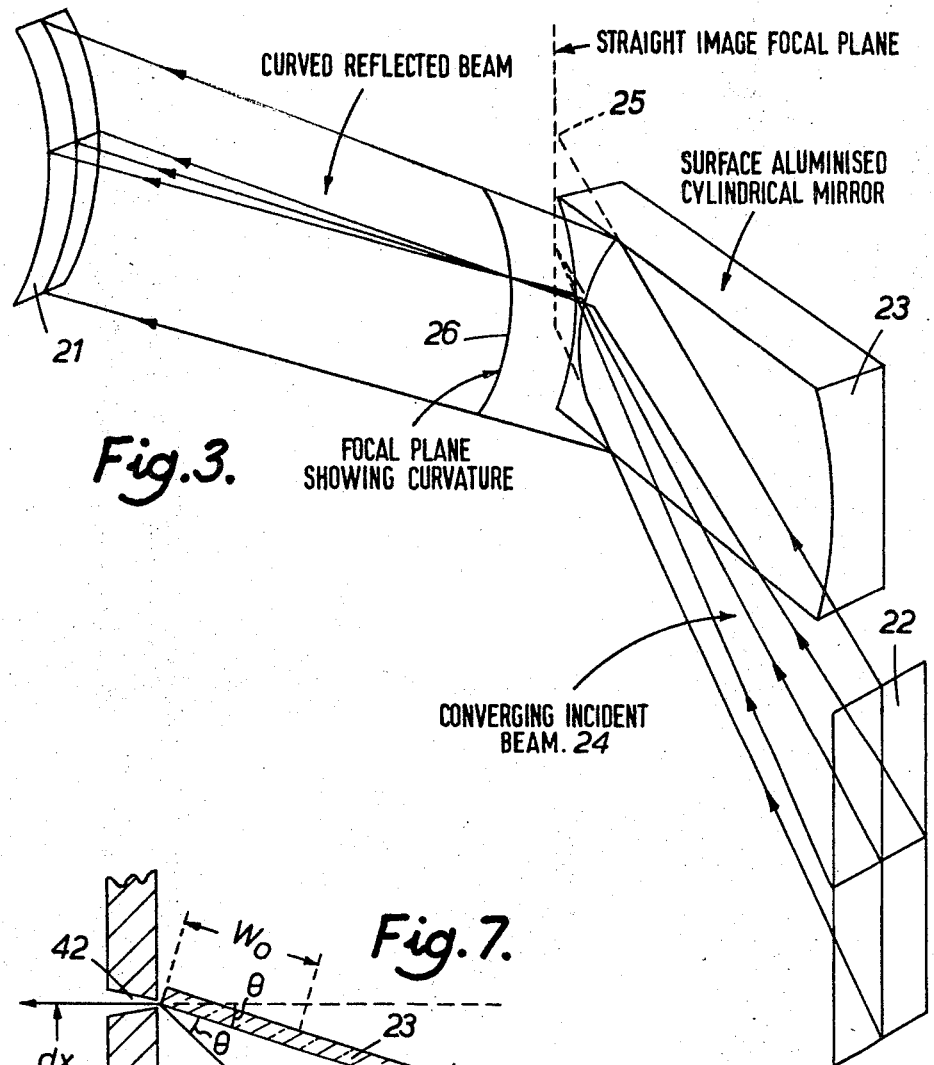
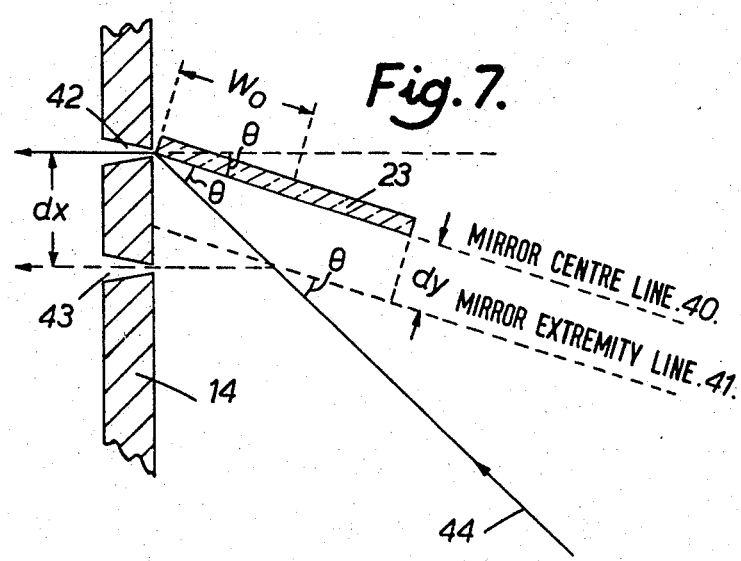

3,575,511

EBERT MONOCHROMATOR WITH IMPROVED SLIT ILLUMINATION USING A CYLINDRICAL MIRROR

BACKGROUND OF THE INVENTION

1. Field of the Invention

This invention relates to monochromators, that is to say devices for providing light of a single wavelength or, in practice a very narrow band of wavelengths.

2. Description of the Prior Art

The invention is more particularly concerned with monochromators having a spherical mirror which reflects light from a curved entrance slit onto a rotatably mounted plane grating, the light from the grating being reflected back through an exit slit. Such monochromators are known as Czerny-Turner monochromators. In general, a pair of off-axis spherical mirrors are employed, one reflecting light from the entry slit onto the grating and the other reflecting light from the grating out through the exit slit. In one particular form known as the Ebert monochromator, which is being increasingly used in spectrophotometry and which was suggested by Fastie in 1952 based upon a spectrograph originally described by Ebert in 1889, the two spherical mirrors have the same radius of curvature and are mounted with a common center of curvature and can therefrom be constituted by a single spherical mirror of sufficient aperture. In the following description reference will be made more particularly to an Ebert monochromator but the invention is applicable to all Czerny-Turner monochromators.

In the Ebert monochromator, the entrance slit and exit slit are formed in an opaque screen lying in a plane through or parallel to the axis of rotation of the grating, and may be strongly curved. The wavelength of the monochromatic light at the exit slit is dependent upon the angle at which the incident light strikes the rotatable grating and Fastie showed that, if the two slits are concentric and on the same circle, then the effects of astigmatic and other aberrations within the monochromator are significantly reduced.

The use of curved slits in monochromators in common practice, but in the Czerny-Turner monochromator and particularly in the Ebert form the degree of slit curvature is significantly greater than, for example, in the Littrow monochromator. Assuming Littrow and Ebert monochromators of equal focal length, the radius of curvature of the Ebert slits might be 3 inches to the radius of curvature of the Littrow slits of 20 inches.

The illumination of a Littrow slit with an elongated source such as a straight filament lamp is acceptable as a short slit approaches straight line form, but this is not so for the Ebert slit of comparable length, which is most usually illuminated by flood lighting the area which includes the slit. This method is inefficient and calls for a far wider source than would otherwise be required as only a small proportion of light produced actually passes through the slit and into the monochromator. A reduction of slit curvature reduces the amount of light lost, but also reduces the advantages offered by the Ebert monochromator over others.

SUMMARY OF THE INVENTION

According to the present invention a monochromator has at least one spherical mirror, a plane grating and entrance and exit slits for nonmonochromatic, e.g. white and monochromatic light respectively, at least the entrance slit being curved, said monochromator has associated therewith a straight elongated light source and optical means adapted to produce upon the curved entrance slit a substantially congruent image of the light source. This arrangement enables a straight elongated light source, such as a straight filament lamp, to be more effectively utilized in a monochromator having a curved entrance slit and particularly allows the use of a narrower light source than has heretofore been possible since the source image now only has to be of the same width as the slit whereas heretofore it has been necessary to use a floodlight system of illumination illuminating a rectangular area of a width encompassing the slit.

The invention is particularly applicable to an Ebert monochromator which, as described above, uses a single spherical mirror and has entry and exit slits which are strongly curved.

A number of different optical components or combination of components may be utilized for producing a curved image of a straight light source. In one convenient form of construction, the aforementioned optical means comprises means, e.g. a convex lens, for forming an image of the light source and a concave cylindrical mirror, conveniently a surface aluminized mirror, mounted at an angle to an incident converging beam of light which would otherwise form a straight sides narrow image, the mirror being positioned so that the resultant curved image of the converging beam of light is at the entrance slit of the monochromator. The mirror is most conveniently mounted closely adjacent the slit. The center of curvature of the mirror preferably lies in the plane defined by the central radius of the slit and the perpendicular to the slit plane at the slit center of curvature.

The presence of the mirror can cause some degree of aberration in the curved image, but this may be minimized by reducing the angle at which the incident beam strikes the mirror surface down to a limit set by considerations of the mirror size and the degree of convergence of the incident beam or may be compensated for within the optical system producing the image of the elongated source.

A similar optical system to that at the entry slit may also be provided at the exit slit to convert the curved image into a straight line image if this is required.

The invention furthermore includes within its scope apparatus, for example spectrophotometric apparatus, embodying a monochromator as described above.

BRIEF DESCRIPTION OF THE DRAWINGS

FIG. 3 is a perspective diagram illustrating how a cylindrical mirror is used to produce a curved image congruent with a curved slit in a slit plane;

FIG. 7 is an optical diagram for illustrating the method of calculating the dimensions of the mirror in the apparatus of FIG. 3;

DESCRIPTION OF THE PREFERRED EMBODIMENT

Figure 1:
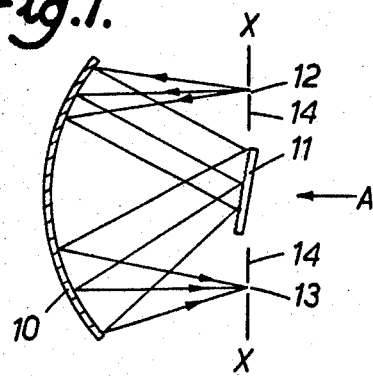
FIG. 1 is a section through the monochromator normal to the axis of rotation of the grating, which axis lies in the plane of the grating.
Figure 2:
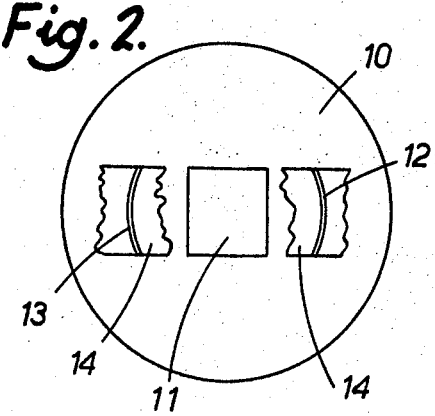
FIG. 2 is a view looking in the direction of the arrow A of FIG. 1.

FIGS. 1 and 2 illustrate a known type of Ebert monochromator. This monochromator has a spherical mirror 10 and a plane grating 11 which is rotatable about an axis perpendicular to the plane of the paper in FIG. 1 which plane passes through the center of curvature of the mirror. The entrance slit 12 and the exit slit 13, which are formed in an opaque screen 14 lying in a plane through or parallel to the axis of rotation of the grating, are curved as shown in FIG. 2. The wavelength of the monochromatic light at the exit slit 13 is dependent upon the angle at which the incident light strikes the rotatable grating. As previously mentioned, it has been shown by Fastie that, if the two slits are concentric and on the same circle, then the effects of astigmatic and other aberrations within the monochromator are significantly reduced. An Ebert monochromator has such curved entry and exit slits. The curved entry slit is in a slit plane marked as XX in FIG. 1. In accordance with the present invention, optical means are provided for producing an image of a straight elongated light source at the entry slit. One form of this apparatus is illustrated diagrammatically in FIG. 3. A curved reflected beam 21 is produced from a rectangular beam 22, in the arrangement of FIG. 3, by the use of a concave cylindrical surface aluminized mirror 23 mounted at an angle to the converging incident beam 24 from the light source. The center of curvature of the mirror 23 lies in a plane defined by the central radius of the slit 12 and the perpendicular to the slit plane XX at the slit center of curvature. Without the mirror in position, a straight line image is formed at the focal plane of the converging incident beam as shown at 25. With the mirror 23 in position, the incident beam 24 is reflected and, due to the extreme vertical rays of the beam striking the mirror surface and being reflected therefrom at points nearer to the source than the central ray, a vertical curved image 26 is formed in the focal plane.

Figure 4:
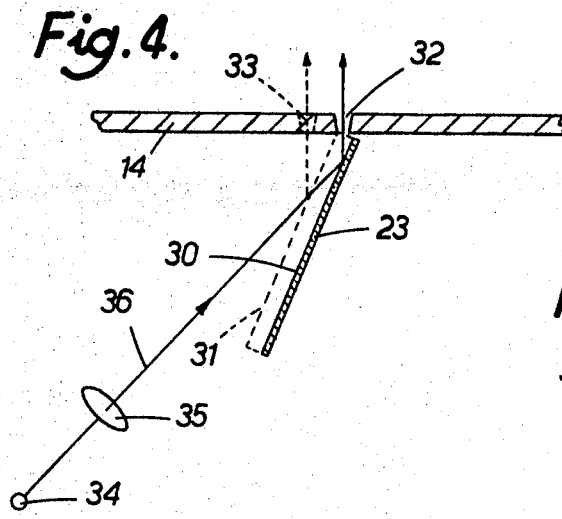
FIG. 4 illustrates diagrammatically an optical arrangement using a curved mirror for producing a curved image congruent with a curved slit in a slit plane.
Figure 5:
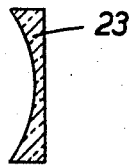
FIG. 5 is a transverse section through the mirror of FIG. 4.
Figure 6:
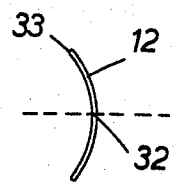
FIG. 6 is a view of an entry slit in a slit plane of an Ebert monochromator looking in a direction normal to the slit plane.

Referring to FIGS. 4, 5 and 6, FIG. 4 illustrates diagrammatically a composite plan of this system for producing a curved image congruent with a curved slit in a slit plane. FIG. 4 is essentially a horizontal section along the centerline of the mirror through its axis. The reflecting surface of the mirror at this point is indicated by the solid line 30 whilst the lower extremity of the mirror is illustrated by the dashed line 31. The slit (which is the entry slit 12 of FIGS. 1 and 2) in this section is indicated at 32 whilst the slit at the level of the lowest point of the mirror is indicated by the dashed lines 33. In FIG. 4 the straight elongated lamp source is indicated at 34 producing by means of a converging optical system 35 a beam of light 36 which is reflected from the mirror 23 to pass through the slit. The central ray is reflected from the mirror center through the slit center 32 whilst extreme rays are reflected from the extremities of the mirror through the slit extremities 33. Rays intermediate between the two extremes strike the mirror surface at intermediate points. The slit is positioned in the image focal plane (26 in FIG. 3) so that a curved image of the source 34 is produced at the slit.

FIG. 7 is an optical diagram illustrating the method of calculating the dimensions of the mirror required for particular application. The centerline of the mirror 23 is shown at 40 and the extremity line at 41. The center and extremities of the slit are shown at 42 and 43 respectively. A ray 44 represents the central plane of a converging beam of light which makes an angle $2\Theta$ with the perpendicular to the slit center. The mirror 23 is mounted with its longitudinal axis at an angle $\Theta$ to the perpendicular to the slit plane. Its center of curvature lies in the plane defined by the central radius of the slit and the perpendicular to the slit plane at the center of curvature. Thus the light passes perpendicularly through the slit after reflection.

Figure 8:
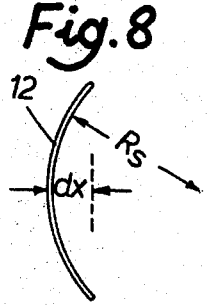
FIG. 8 is a diagram illustrating a curved slit in a slit plane.
Figure 9:
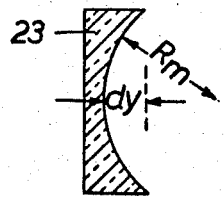
FIG. 9 is a section of a mirror illustrating certain dimensions.
Figure 10:
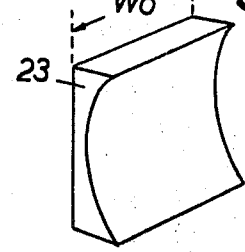
FIG. 10 is a perspective view of a cylindrical concave mirror.

FIG. 8 shows dimensions of the slit 12 and FIGS. 9 and 10 shows dimensions of the mirror 23 which are used in the following calculations. For the slit, $dx$ represents the perpendicular distance between the slit center and the chord joining the slit extremities and $R_s$ and the radius of curvature. Referring to the mirror, $R_m$ denotes the cylinder radius of curvature, $dy$ the perpendicular distance between the mirror center and the chord joining the extremities of the mirror and $Wo$ the width of the mirror. In FIG. 7, for clarity, the mirror 23 is elongated beyond the necessary width $Wo$. It will be seen that only the portion of width $Wo$ is utilized.

The mirror is calculated using the formulas:

$$dy = \frac{dx}{2 \cos \theta} \quad \text{(i)}$$

$$R_m \simeq 2 R_s \cos \theta \quad \text{(ii)}$$

and $$Wo = dx \left\{ \frac{1}{2 \sin \theta} + \frac{\sin \delta}{\tan 2\theta \cdot \sin (\theta - \delta)} \right\} \quad \text{(iii)}$$

where $\delta$ is the convergence semiangle and considering that the difference of focal length between mirror center and extremity is:

$$\Delta f = dx \left\{ \frac{1 - \cos 2\theta}{\sin 2\theta} \right\}$$

For example, the entrance slit 12 of an Ebert monochromator has a radius of curvature of 2.6 inches and a distance $dx$ of 0.2 inch and it is required to calculate the dimensions of the concave cylindrical mirror 23 needed to produce a curved image on the slit from a converging beam of 6° semiangle, assuming an input beam which would produce a straight image of the source in the slit plane equal in height to the slit chord, i.e. 2.0 inches.

The angle $\Theta$ at which the mirror 23 is mounted with respect to the slit plane XX must be a compromise between the degree of differential focusing, $\Delta f$, which is tolerable and the width of the mirror, $Wo$, which can be accommodated, the degree of differential focusing increasing with $\Theta$ and the mirror width $Wo$ decreasing. For calculation, however, an initial value of $\Theta$ must be selected and practical considerations indicate that 20° is satisfactory for this purpose.

(a)
$$dy = \frac{dx}{2 \cos \theta}$$
$$= \frac{0.2}{(2 \cos 20°)}$$
$$= \frac{0.2}{2 \times .94}$$
$$\underline{dy = 0.11''}$$

(b)
$$R_m = 2 R_s \cos \theta$$
$$= 2 \times 2.6 (\cos 20)$$
$$= 5.2 (0.94)$$
$$\underline{R_m = 4.88''}$$

(c)
$$Wo = dx \left[ \frac{1}{2} \sin \theta + \frac{\sin \delta}{\tan 2\theta \sin (\theta - \delta)} \right]$$
$$= 0.2 \left[ \frac{1}{2(0.34)} + \frac{0.052}{(0.84)(0.29)} \right]$$
$$= 0.2 (1.47 + 0.22)$$
$$\underline{Wo = 0.34''}$$

(d)
$$\Delta f = dx \left[ \frac{1 - \cos 2\theta}{\sin 2\theta} \right]$$
$$= \left[ \frac{1 - \cos 40°}{\sin 40°} \right]$$
$$= 0.2 \left[ \frac{0.23}{0.64} \right]$$
$$\underline{\Delta f = 0.072''}$$

The calculations show that the concave surface aluminized mirror needed to produce a curved image for the specified slit is one in which:

Cylinder radius = 4.88 inches...$R_m$
Depth = 0.11 inch...$dy$
Width = 0.34 inch...$Wo$ These dimensions assume that the mirror is cut and mounted to abut the slit plane and that it is possible to accurately align the mirror with the input beam to avoid vignetting. For practical reasons it is thus preferable to increase the mirror width and depth dimensions by, say, 10 percent.

If the focus differential is considered too great the mirror may be recalculated taking successive values of $\Theta$ until the optimum is achieved. The focus differential of 0.072 inch in the present case may be compensated for over the length of the slit by imparting field curvature in a known manner to the optical system producing the converging input beam. To produce a requisite correction in the present instance the radius of field curvature required would be approximately 7 inches.

The dispersing element of an Ebert monochromator is most effectively illuminated with light from each part of the entrance slit if the center of the beam of light from each part of the slit is perpendicular or nearly perpendicular to the slit plane. In conventional Ebert monochromators, for this reason a field lens, i.e. a convex lens of suitable focal length can be placed immediately in front of the entrance slit. In the monochromator described above, the cylindrical mirror 23 may be used as the equivalent of the field lens. Since the curvature of the mirror is determined by the considerations previously discussed, the imaging system has to be chosen so as to have suitable image conjugate distance $dc$. This image conjugate distance is the distance from the edge of the mirror nearest the slit at the slit center to the point of intersection between first and second lines, the first line being at a distance of half the radius of curvature from and parallel to the center of the mirror and in the plane of the axis of curvature and the center of the mirror and the second line being between the aforesaid edge of the mirror nearest the center of the slit and the center of the image forming system aperture. It may be shown that this image conjugate distance $dc$ should be $Rm/2 \sin \Theta$ From the example given above, where $Rm$ is calculated to be 4.88 inches and $\Theta=20°$, then $dc=7.13$ inches. The position of the lens 35 of FIG. 4 is therefore preferably determined in this way.

Although the improved monochromator has been described as having a concave cylindrical surface aluminized mirror to produce the curved image other optical components or combinations of components may be used as will be apparent to those skilled in the art. For example, concave mirrors of other than cylindrical form, convex mirrors, concave lenses and convex lenses, all of which must be mounted at an angle to the slit plane of the monochromator.

Similarly, although the improved monochromator has been described as having optical means for producing a curved image of an elongated source upon the entrance slit, a similar optical system to the one described may be used adjacent to the exit slit to produce a straight image of the curved image there formed.

I claim:

1. An Ebert monochromator having at least one spherical mirror, a plane grating, and entrance and exit slits for nonmonochromatic and monochromatic light respectively of which at least the entrance slit is curved and having associated therewith a straight elongated light source and optical means forming, upon the curved entrance slit, a substantially congruent image.

2. A monochromator as claimed in claim 1 wherein the light source is a straight filament lamp.

3. A monochromator as claimed in claim 1 wherein the means for forming an image of the light source comprises a convex lens.

4. A monochromator as claimed in claim 1 wherein the center of curvature of said concave cylindrical mirror lies in a plane defined by the central radius of the entrance slit and the perpendicular to the slit plane at the slit center of curvature.

5. A monochromator as claimed in claim 1 wherein optical means are provided for converting the curved image of the exit slit into a straight line image.

6. An Ebert monochromator as claimed in claim 1 wherein the mirror centerline is at an angle $\Theta$ to the axis of the converging beam and wherein the perpendicular distance $dy$ between the mirror center and the chord joining the extremities of the mirror is given by $$dy = \frac{dx}{2 \cos \theta}$$

where $dx$ is the perpendicular distance between the center of the entry slit and the chord joining the slit extremities.

7. An Ebert monochromator as claimed in claim 6 wherein the entrance slit is a circular arc and wherein the mirror is mounted with its center of curvature in the plane defined by the central radius of the slit and perpendicular to the slit plane at the center of curvature.

8. An Ebert monochromator as claimed in claim 1 wherein the mirror centerline is at a shallow angle to the axis of the converging beam.

9. An Ebert monochromator as claimed in claim 1 wherein the mirror center is at an angle of approximately 20° to the axis of the converging beam.

10. In an Ebert monochromator having a spherical mirror and a plane rotatable grating with entrance and exit slits for white and monochromatic light respectively, at least the entrance slit being curved; the combination of a straight filament lamp, and optical means including a convex lens and a concave cylindrical reflector forming a curved image of the lamp filament substantially congruent with said entrance slit, said concave cylindrical reflector being positioned closely adjacent the entrance slit with the center of curvature of the cylindrical reflector lying in a plane defined by the central radius of the entrance slit and the perpendicular to the slit plane at the slit center of curvature.